United States Patent [19]

Moller et al.

[11] Patent Number: 5,889,512
[45] Date of Patent: Mar. 30, 1999

[54] EXTENDIBLE STYLUS

[75] Inventors: Ronald J. Moller, Boulder Creek; Jonathan P. Ive, San Francisco, both of Calif.

[73] Assignee: Apple Computer, Inc., Cupertino, Calif.

[21] Appl. No.: 506,462

[22] Filed: Jul. 24, 1995

Related U.S. Application Data

[63] Continuation of Ser. No. 205,314, Mar. 2, 1994, abandoned.

[51] Int. Cl.$^6$ .................................................... G09G 5/00
[52] U.S. Cl. ...................... 345/179; 178/19.01; 401/95; 401/117
[58] Field of Search ...................... 345/179, 180, 345/181, 182, 183, 156; 178/18, 19, 20, 87, 19.01, 19.04; 401/95, 117

[56] References Cited

U.S. PATENT DOCUMENTS

| | | | |
|---|---|---|---|
| 1,807,444 | 5/1931 | Shatkin | 401/95 |
| 4,678,356 | 7/1987 | Garland | 401/95 |
| 5,049,863 | 9/1991 | Oka | 345/163 |
| 5,179,502 | 1/1993 | Matsuda | 361/392 |
| 5,180,891 | 1/1993 | Trumbo | 178/18 |
| 5,287,121 | 2/1994 | Louis et al. | 345/179 |

OTHER PUBLICATIONS

Cohen, Rains, "Slimmed–Down MessagePad to Beef up RAM, Recognition," MacWEEK, Feb. 14, 1994, vol. 8, No. 7, pp. 1 & 84.

*Primary Examiner*—Richard A. Hjerpe
*Assistant Examiner*—Kent Chang
*Attorney, Agent, or Firm*—Beyer & Weaver, LLP

[57] ABSTRACT

An extendible stylus includes a body and an extension telescopically engaged with the body. The stylus may be extended to an open position and collapsed to a closed position, where opposite ends of the stylus are farther apart in the open position. A first, internal detent mechanism of the stylus retains the stylus in the open position. A stop mechanism preferably holds the stylus in the closed position. A receptacle, such as a hole in a case of a portable computer, is engageable with the stylus such that a second, external detent mechanism is provided between the case and the stylus to retain the stylus in engagement with the case. The case is provided with a member which engages a groove positioned on one end of the stylus to form the second detent mechanism. When the stylus is being engaged with the case, a force to overcome the first detent mechanism is greater than a force to overcome the second detent mechanism so that the stylus can be engaged with the case before the stylus is moved to the closed position. When the stylus is being disengaged from the case, the force to overcome the first detent mechanism is less than the force to overcome the second detent mechanism, so that the stylus can be extended to its open position before it is removed from the case.

11 Claims, 6 Drawing Sheets

EXTENDIBLE STYLUS

This is a continuation, of application Ser. No. 08/205,314 filed Mar. 2, 1994, now abandoned.

BACKGROUND OF THE INVENTION

The present invention relates generally to styluses and receptacles therefor, and more particularly to an extendible stylus used for a pen-based computer system.

Computerized personal organizers are becoming increasingly popular. They perform such functions as keeping a calendar, an address book, a to-do list, etc. While these functions can be provided by conventional computer systems, they are more conveniently provided by personal organizers which are relatively inexpensive, small, lightweight, and portable.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position and/or pressure of the tip of a stylus on the viewing screen and provides this positional information to the computer's central processing unit (CPU). When operating as an output device, the display assembly presents computer-generated images on the screen. Users can operate the computers as computerized notepads by moving the stylus across the surface of the screen. The CPU generates a corresponding image on the screen to create the illusion that the stylus is drawing (or "inking") the image directly upon the screen. With suitable recognition software, the "ink" can be identified as text and numeric information. An example of a pen-based computer is the Newton™ Personal Digital Assistant (PDA) made by Apple Computer, Inc. of Cupertino, Calif.

Pen-based computers and many other electrical apparatus are portable, and, as such, should be enclosed in durable, functional enclosures or housings. In addition, a pen-based computer includes a stylus for inputting strokes on the display of the computer. The stylus is either stored in a separate area or is attached to the pen-based computer using a variety of methods. The storage area for a stylus is often limited, however, due to the portable size of pen-based computers.

What is needed is a stylus for a portable computer or similar electrical apparatus which is functionally and conveniently retained by the enclosure of the computer, which can be stored compactly and yet is of sufficient size such that it is comfortable to use.

SUMMARY OF THE INVENTION

The present invention provides an extendible stylus that can be engaged with or disengaged from a case of a pen-based computer. The stylus of the present invention can be extended for use and contracted for storage in a receptacle of the case, thus requiring a relatively small storage area.

The extendible stylus of the present invention comprises a first end portion and a second end portion telescopically engaged with the first end portion. The stylus may be extended to an open (extended) position and collapsed to a closed (contracted) position, where the first and second ends are further apart in the open position. An internal detent mechanism retains the stylus in the open position. The exposed portion of the second end portion in the open position is preferably at least 20% of the length of the first end portion. The internal detent mechanism preferably includes a tongue positioned on the second end portion which engages a groove positioned on the first end portion. A stop mechanism preferably holds the stylus in the closed position; the stop mechanism preferably includes a plurality of grooves positioned on the first end portion, a plurality of guides on the second end portion, and at least one stop member positioned in at least one of the grooves such that the second end portion is held in the closed position when one of the guides engages the stop member. The second end portion preferably includes a spring member which is compressed when the stylus is in the closed position.

An extendible stylus and case therefor of the present invention comprises a stylus as described above and a case engageable with the stylus such that a second detent mechanism is provided between the case and the stylus to retain the stylus in engagement with the case. The case preferably includes receptacle or hole receptive to the stylus, and the case is provided with a member which engages an external portion of the stylus to form the second detent mechanism. The external portion of the stylus forming a portion of the second detent mechanism is preferably a groove encircling a first end portion of the stylus. When the stylus is engaged with the case, a force to overcome the first detent mechanism is greater than a force to overcome the second detent mechanism so that the stylus can be engaged with the case before the second end portion of the stylus moves to the closed position. When the stylus is disengaged from the case, the force to overcome the first detent mechanism is less than the force to overcome the second detent mechanism, so that the second end portion of the stylus can be moved to its open position before the stylus is removed from the case.

The present invention provides an extendible stylus for a pen-based computer and a receptacle therefor. The extended length of the stylus allows comfortable and easy use, and the contracted length of the stylus permits the stylus to be conveniently stored in a relatively small receptacle. The detent mechanisms of the present invention allow the stylus to be easily opened and closed.

These and other advantages of the present invention will become apparent to those skilled in the art upon a reading of the following specification of the invention and a study of the several figures of the drawing.

BRIEF DESCRIPTION OF THE DRAWINGS

FIG. 16b is a side sectional view of the rear portion of the stylus body taken along line 16b—16b of FIG. 16a;

DETAILED DESCRIPTION OF THE PREFERRED EMBODIMENT

The present invention is well suited for portable pointer-based computer systems such as the pen-based or pen-aware systems that are currently popular. For the purposes of illustration, the invention will be described in connection with a portable pen-based computer system, such as a Newton™ PDA. However, the present invention is also suitable for other types of pen-based computers, such as desktop pen-based computers and other computer systems in which input can be entered by contacting a stylus on a surface. Similarly, the present invention is well suited for use with other portable and non-portable devices which require the use of a stylus, as, for example, a touch tablet for inputting strokes into a computer system, a pen-and-paper notebook device, or any device requiring a stylus but requiring reduced space in which to store the stylus.

Figures 1, 2:
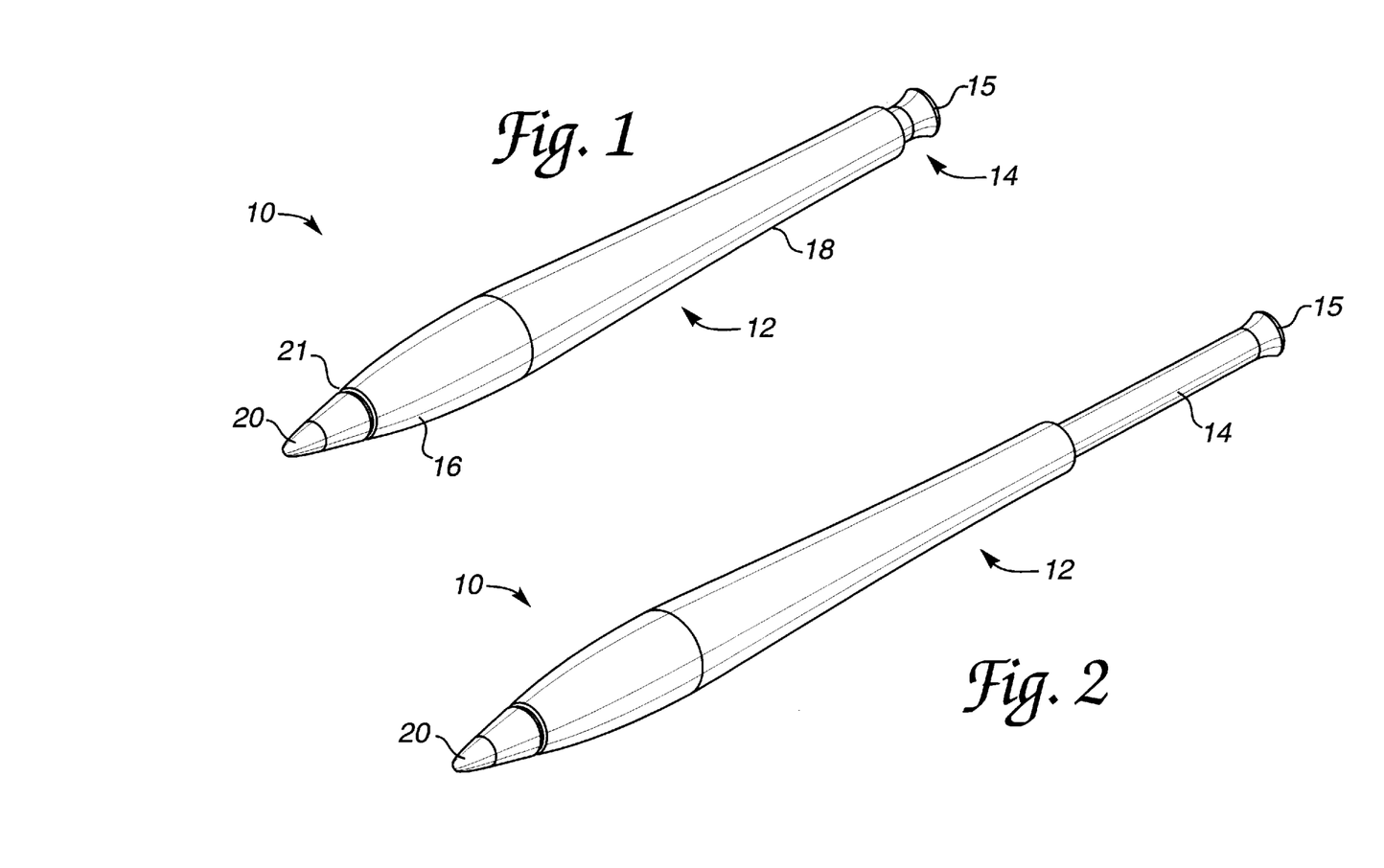
FIG. 1 is a perspective view of an extendible stylus in accordance with the present invention with the extension of the stylus in a closed position.
FIG. 2 is a perspective view of the stylus of the present invention with the extension of the stylus in an open position.

As shown in FIG. 1, an extendible stylus 10 in accordance with the present invention includes a stylus body ("first end portion") 12 and a stylus extension ("second end portion") 14. Body 12 includes a grip portion 16 and a rear portion 18. In the described embodiment, grip portion 16 is made of a lightweight metal, and rear portion 18 is made out of durable plastic. These portions can also be made from other suitable materials. Grip portion 16 includes a nib or tip 20 which is used in the described embodiment to contact the surface of a display assembly. For example, a display assembly suitable for use with the stylus of the present invention can be both an input and an output device. When operating as an output device, the display assembly receives data from a microprocessor or other controller and displays that data on a suitable screen. The screen for the display assembly, for example, can be a liquid crystal display (LCD) of the type commercially available from a variety of vendors. The input device of display assembly, for example, can be a thin, clear membrane which covers the display screen and which is sensitive to the position of the stylus tip 20 on its surface. With such a structure, the membrane of the display assembly can serve as an input "tablet." These position sensitive membranes are also readily available on the commercial market. Alternatively, other types of tablets can be used, such as inductively coupled tablets. Combination display assemblies such as the display assembly described above which include both the LCD and the input membrane are commercially available from such vendors as Scriptel Corporation of Columbus, Ohio. In alternative embodiments, a separate input area for stylus 10 can be used, such as a touch tablet, for inputting strokes into a computer system. A separate display screen can be used to display the inputted strokes and other information.

Grip portion 16 of stylus 10 also preferably includes a circumferential groove 21. Groove 21 is a component of an external detent mechanism used to secure stylus 10 in a receptacle, such as a hole provided in the case of a pen-based computer. This operation of stylus 10 is described in more detail with respect to FIGS. 3–8. Herein, the term "external detent mechanism" refers to a (second) detent mechanism at least partially external to the stylus, while "internal detent mechanism" refers to a (first) detent mechanism internal to the stylus body 12.

Rear portion 18 of stylus body 12 is coupled to grip portion 16. In the described embodiment, rear portion 18 is hollow to allow extension 14 to contract within stylus body 12. In alternate embodiments, extension 14 can be engaged with body 12 using other methods. For example, extension 14 can be supported alongside body 12 by a receptacle coupled to body 12, wherein the extension is telescopically engaged with the receptacle.

The position of stylus extension 14 is secured relative to stylus body 12 by a stop mechanism in a closed (contracted) position and by an internal detent mechanism in an open (extended) position. This is described in greater detail below. Extension 14 is preferably an elongated, cylindrical member whose cross-section has a smaller diameter than the interior cross-sectional diameter of stylus body 12. Extension 14 is thus telescopically engaged with body 12 and can fit within hollow stylus body 12.

Extension 14 is shown in a closed position in FIG. 1, wherein extension 14 is positioned inside stylus body 12. This position is used when the stylus is being stored. For example, the stylus, in the contracted position, can be stored within a receptacle of a pen-based computer so that the extension 14 is not protruding from the receptacle. Stylus 10 thus can be stored in a shorter space than the fully-extended length of the stylus. In the described embodiment, extension 14 is secured in the closed position so that the extension cannot be moved without releasing the stop mechanism (described with reference to FIG. 14).

FIG. 2 is a perspective view of stylus 10 in which extension 14 is in an open or extended or expanded position. After releasing the stop mechanism holding extension 14 in a closed position as shown in FIG. 1, a user can extend extension 14 to the position shown and secure the extension in the open position. In the open position, an end 15 of stylus 10 is farther apart from tip 20 than when the stylus is in the closed position. An internal detent mechanism retains the extension in this position, as detailed below with reference to FIG. 15. In the described embodiment, the exposed length of extension 14 is about 40% of the length of body 12. In alternate embodiments, the exposed length of extension 14 is preferably at least 20% or as much as 80% of the length of body 12. The extension adds length to stylus 10, allowing a user to manipulate the stylus more easily and comfortably by resting the extension 14 in the web of the hand between the thumb and forefinger.

Figures 3, 3A, 4:
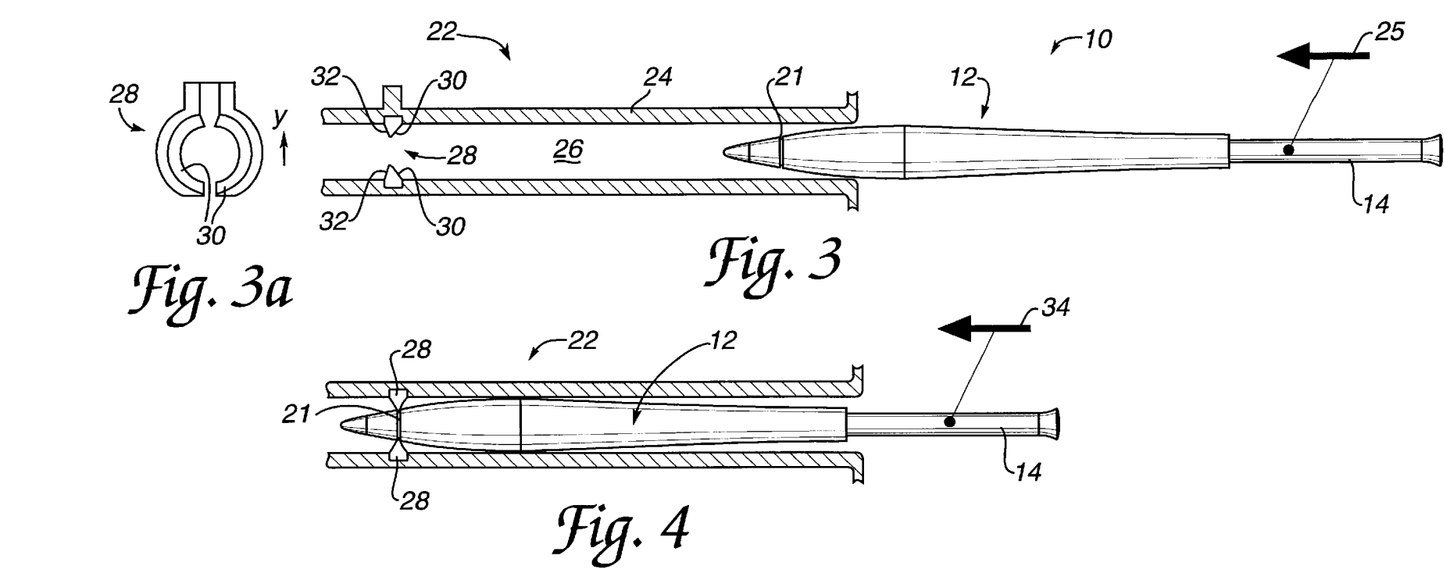
FIG. 3 is a side elevational view of the stylus and a receptacle for the stylus.
FIG. 3a is a rear view of a member in the receptacle engagable with the stylus.
FIG. 4 side elevational view showing the stylus and receptacle wherein the stylus is engaged with the receptacle.

FIG. 3 is a partially-sectioned side elevational view of extendible stylus 10 and a receptacle 22. In the described embodiment, receptacle 22 is part of a housing or case 24 of a pen-based, portable computer. A hole 26 is provided in case 24 to receive stylus 10. In alternate embodiments, receptacle 22 can be provided as a separate structure from a housing such as case 24. For example, receptacle 22 can be a separate stylus holder attached to the outside of the case. Alternatively, the receptacle can simply be a guide for the stylus of many shapes or forms. Force is applied to stylus 10 in the direction of arrow 25; preferably, extension 14 is retained in its open position and is pushed by a user to move stylus 10 into hole 26. Within hole 26 is positioned a receptacle member 28, which, together with groove 21 on stylus 10, form an external detent mechanism which retains the stylus 10 in receptacle 22. In thy described embodiment, member 28 is a unitary member which has a circular aperture, as shown by the rear view of member 28 in FIG. 3a. Member 28 includes two angled surfaces which determine the force necessary to engage groove 21 with member 28, i.e. the detent force. Surface 30 initially contacts the front end of stylus 10 when the stylus is moved into hole 26. Surfaces 32 of member 28 contact groove 21 when stylus 10 is moved in a direction opposite to the direction indicated by arrow 25 to disengage the stylus from the receptacle (shown in FIG. 8). Surface 32 is preferably angled closer to the vertical direction (indicated by axis y) than surface 30 so that the force required to engage stylus 10 with member 28 is less than the force required to disengage stylus 10 from member 28. This arrangement is desirable so that extension 14 can remain in the open position when engaging the stylus with the receptacle and so that the extension can be extended to the open position before disengaging the stylus from the receptacle (explained below).

Groove 21 and member 28 can be considered catch members of a detent mechanism, since they can be engaged and disengaged. In alternate embodiments, a detent mechanism similar to that described above can be obtained by positioning a groove in receptacle 22 instead of member 28, and positioning a catch member similar to member 28 on grip portion 16 of stylus 10.

FIG. 4 is a side elevational view showing stylus 10 engaged with receptacle 22. The user has applied enough force to stylus 10 to engage member 28 with groove 21. The forward travel of the stylus 10 is limited by the aperture of member 28. Extension 14 is still in its open position, i.e. the portions of an internal detent mechanism holding the extension in its open position are still engaged. The user applies a greater force to extension 14 in the direction indicated by arrow 34 to disengage the members of the internal detent mechanism and collapse the stylus. A greater force is thus required to overcome the internal detent mechanism than the external detent mechanism when the stylus is being engaged with case 24.

Figure 5:
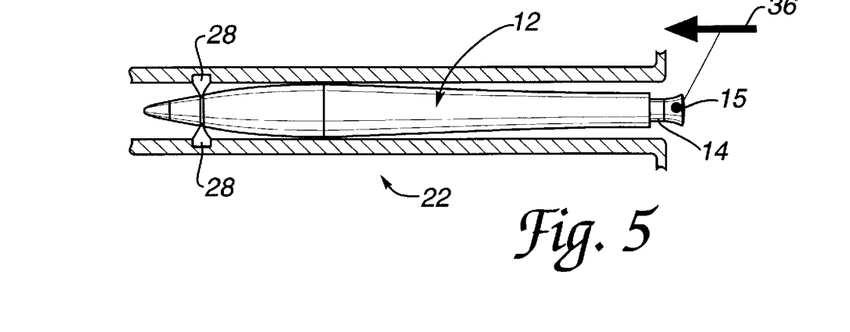
FIG. 5 is a side elevational view showing the stylus engaged with the receptacle and the extension is in its closed position.
Figure 9:
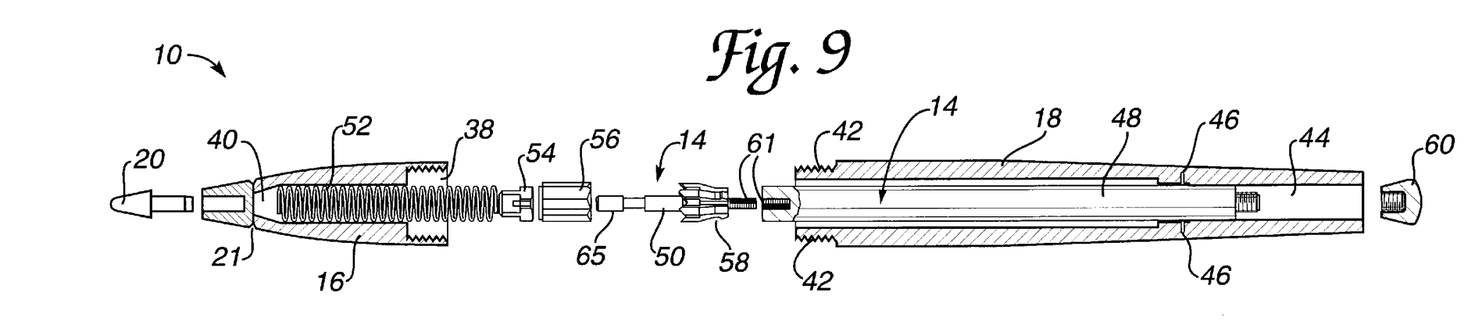
FIG. 9 is a side sectional exploded view of the stylus.

FIG. 5 is a side elevational view showing stylus 10 engaged with receptacle 22 and extension 14 in its closed position. In this position, the end 15 of stylus 10 barely protrudes from the hole 26. The user has disengaged the members of the internal detent mechanism which held the extension in the open position and has moved extension 14 to a closed position in a direction indicated by arrow 36. In the described embodiment, extension 14 must be forced slightly further in the direction of arrow 36 than is shown in FIG. 9 so that a stop mechanism engages and holds extension 14 in the closed position (detailed with reference to FIG. 14).

Figure 6:
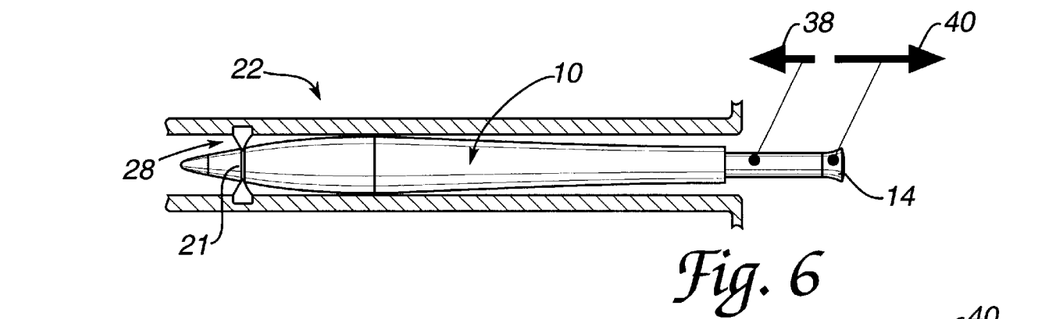
FIG. 6 is a side elevational view showing the stylus engaged with the receptacle wherein the user has disengaged the extension from its closed position.

FIG. 6 is a side elevational view showing stylus 10 and receptacle 22 wherein the user has disengaged extension 14 from its closed position and has begun to extend extension 14 to remove stylus 10 from receptacle 22. Extension 14 is first pushed in the direction indicated by arrow 38 to disengage the stop mechanism. Extension 40 is then moved in a direction indicated by arrow 40 to its open position.

Figure 7:
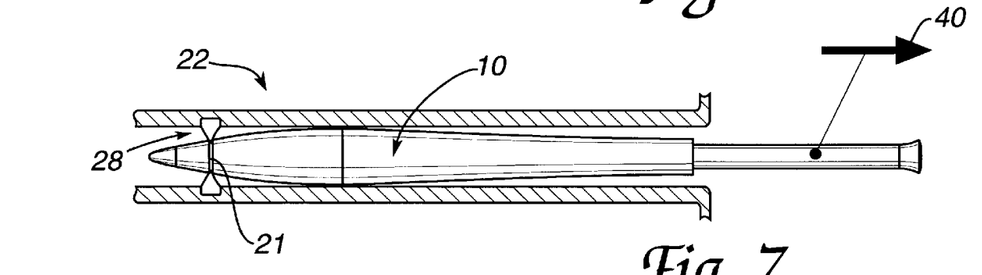
FIG. 7 is a side elevational view showing stylus engaged with the receptacle wherein the user has moved the extension to its open position.

FIG. 7 is a side elevational view showing stylus 10 engaged with receptacle 22 wherein the user has moved extension 14 to its open position and has thus engaged the members of the internal detent mechanism of stylus 10. Groove 21 and member 28 of the external detent mechanism remain engaged, since the force required to engage the members of the internal detent mechanism is not large enough to disengage the members of the external detent mechanism.

Figure 8:
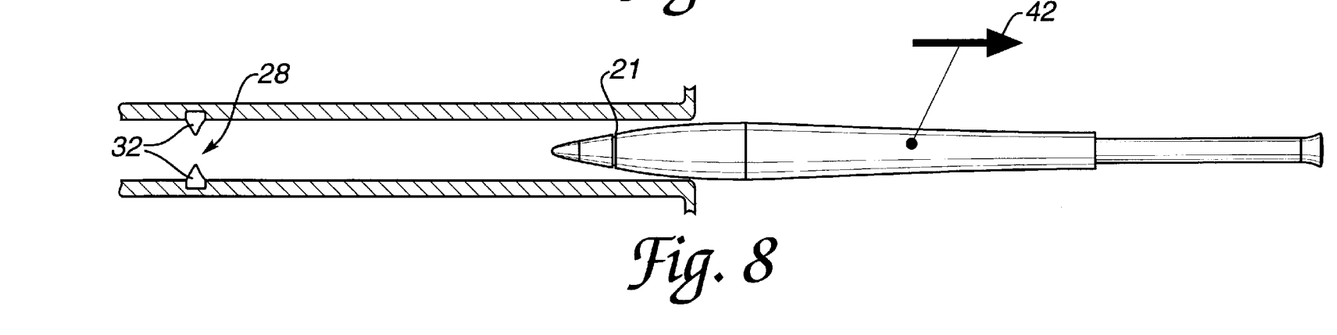
FIG. 8 is a side elevational view showing the stylus is disengaged from the receptacle.

FIG. 8 is a side elevational view showing stylus 10 disengaged from receptacle 22 wherein the user has applied a greater force than shown in FIG. 7 in the direction indicated by arrow 42. This greater force is sufficient to disengage groove 21 from member 28, allowing stylus 10 to be removed from receptacle 22. Surface 32 of member 28, being angled closer to vertical direction y, requires that a greater force be applied to disengage the portions of the external detent mechanism. This prevents stylus 10 from disengaging from receptacle 22 before the internal detent mechanism is engaged and extension 14 has been opened.

FIG. 9 is a side sectional exploded view of the stylus 10. Tip 20 engages grip portion 16 of stylus body 12. Grip portion 16 includes a threaded bore 38 and a central aperture 40. Central aperture 40 of grip portion 16 extends to groove 21. Rear portion 18 includes screw threads 42, a central aperture 44, and a groove 46. Rear portion 18 engages grip portion 16 using screw threads 42 to engage threaded bore 38. Central aperture 44 houses extension 14. Groove 46 is a portion of the internal detent mechanism used to hold the extension 18 in an open position (see FIG. 15).

Extension 14 includes an extension member 48, an axle 50, a spring member 52, a spring coupler 54, a rotatable member 56, a guide member 58, and an extension cap 60. Axle 50 is coupled to extension member 48 preferably by a screw and bore 61. Spring coupler 54, rotatable member 56, and guide member 58 are coupled to axle 50 through holes positioned in the center of these components. Spring member 52 is coupled to spring coupler 54 and is positioned in central aperture 40 of tip end portion 16. Extension cap 60 engages the opposite end of extension member 48 using screw threads and a bore. Spring 52, spring coupler 54, rotatable member 56, and guide member 58 can be considered an "extension catch mechanism", since some of these components are used to hold the extension in the closed position and some components are used to hold the extension in the open position.

Figure 10:
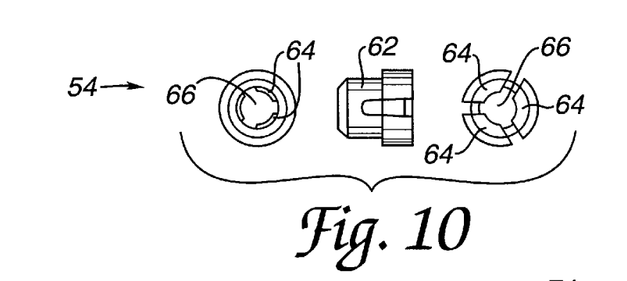
FIG. 10 shows front, side and rear views of a spring coupler used within the stylus.

FIG. 10 shows the front, side and rear views of spring coupler 54. Spring member 52 (shown in FIG. 9) is preferably coupled to neck 62 of the spring coupler. Stops 64 in the interior of spring coupler 54 prevent the spring coupler from being removed from a head 65 of axle 50 (see FIG. 9). Center hole 66 of spring member 52 allows member 52 rotational and partial translational movement on axis 50.

Figure 11:
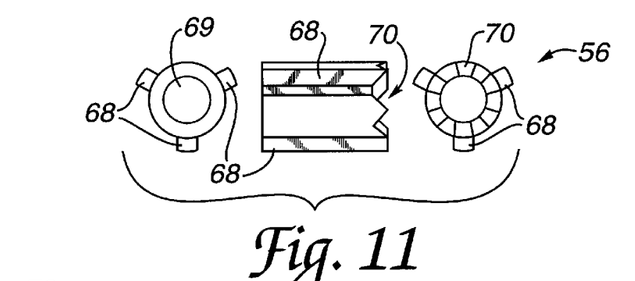
FIG. 11 shows front, side and rear views of a rotatable member used within the stylus

FIG. 11 shows the front, side and rear views of rotatable member 56. Member 56 includes a central hole 69 and a plurality of guides 68 spaced equally around the outer circumference of the rotatable member. In the described embodiment, three guides 68 are positioned to engage grooves provided on the interior surface of rear portion 18 of body 14. This is described in greater detail with reference to FIGS. 16a–b and 17. Rotatable member 56 also includes an edge 70 provided on one end of the member which is operative to engage an edge of guide member 58. In the described embodiment, this edge is configured in a sawtooth-shaped pattern around the edge of the member which engages a similarly-shaped edge of guide member 58.

Figure 12:
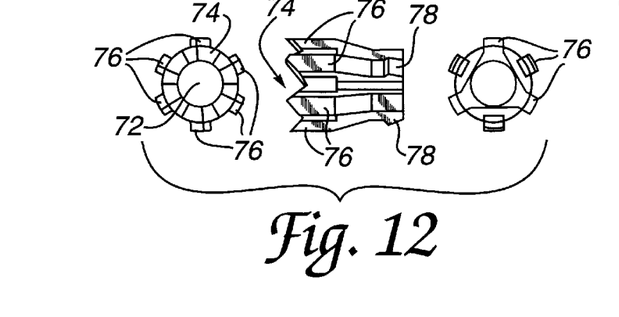
FIG. 12 shows front, side and rear views of a guide member used within the stylus.

FIG. 12 shows the front, side, and rear views of guide member 58. Guide member 58 includes central hole 52. The front side 74 of member 38 is configured in a sawtooth-shaped pattern which can be engaged with the similarly-shaped edge of rotatable member 56. Member 38 also includes a plurality of guides 76 spaced evenly around the outer circumference of the member. These guides are operative to engage grooves positioned longitudinally along the interior of rear portion 18 of stylus body 12 (detailed with reference to FIGS. 16a–b and 17). In the described embodiment, six guides are equally spaced around guide member 58.

Guide member 58 also includes one or more tongues 78 or similar catch members positioned on one or more of the guides 76. In the described embodiment, a tongue 78 is positioned on every other guide, such that three equally spaced tongues are positioned around the outer circumference of the member 58. Tongues 78 are a portion of the internal detent mechanism operative to hold extension 48 in an open (extended) position. Tongues 78 engage groove 46 (shown in FIG. 9) positioned in the interior of extension end portion 18 and are described in greater detail with reference to FIG. 15.

Figure 13:
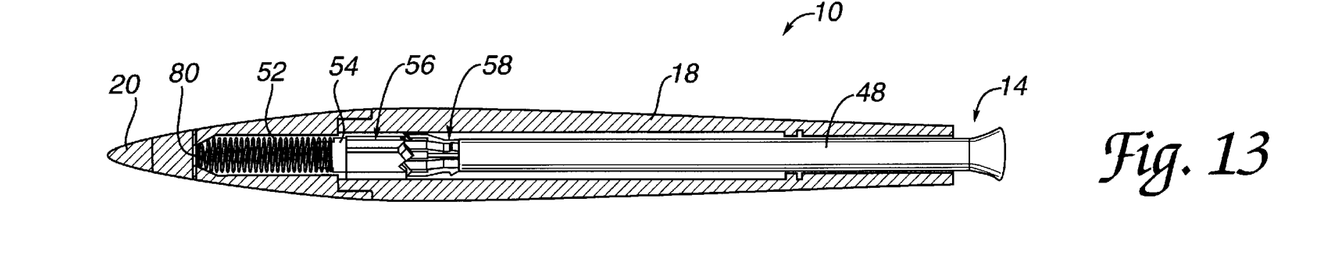
FIG. 13 is a side cross-sectional view of the stylus wherein the extension is in a closed position.

FIG. 13 is a side cross-sectional view of stylus 10 wherein extension 14 is in a closed (contracted or collapsed) position. Guide member 58 is held in the position shown due to its guides 76 being secured in grooves on the interior of rear portion 18 of body 12 (shown in FIG. 16a–b). Rotatable member 56 is held in a position such that its guides 68 are aligned with guides 76 in the grooves of portion 18. Spring coupler 54 is forced against head 65 (shown in FIG. 9) of axle 50. Spring member 52 is compressed against spring coupler 54 and a wall 80 of central aperture 40. Spring member 52 thus forces extension 14 in a direction away from the tip 20 of stylus 10. Guides 68 of rotatable member 56 are engaged with stop members positioned in a number of the grooves of the body 12 to form a stop mechanism which locks extension 14 in the closed position. The stop mechanism is described in greater detail with respect to FIGS. 16a–b and 17.

Figure 14:
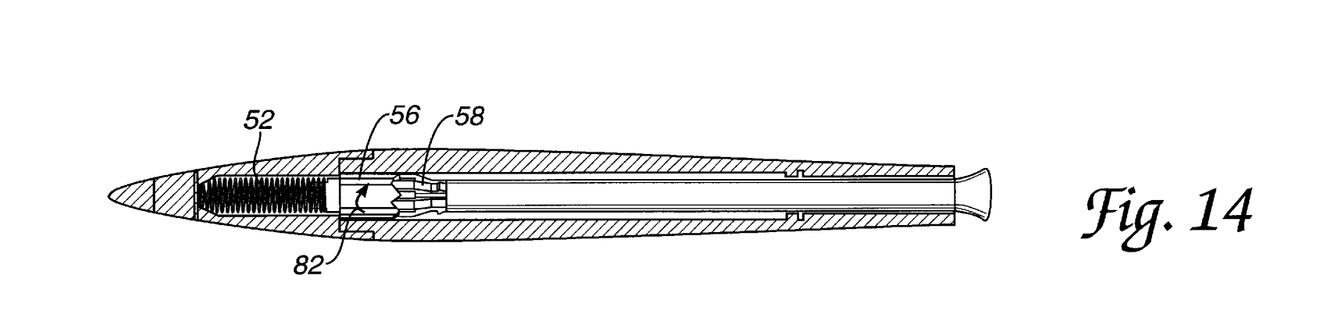
FIG. 14 is a side cross-sectional view of the stylus wherein the extension has been pressed towards the tip of the stylus.

FIG. 14 is a side cross-sectional view of stylus 10 wherein extension 14 has been pressed towards tip 20 to either engage the stop mechanism and position extension 14 in the closed position, or to disengage the stop mechanism to allow extension 14 to move to the open position (away from tip 20). When extension 14 is moved to the position shown, rotatable member 56 rotates as shown by arrow 82. This action is described in more detail with reference to FIG. 18.

Figure 15:
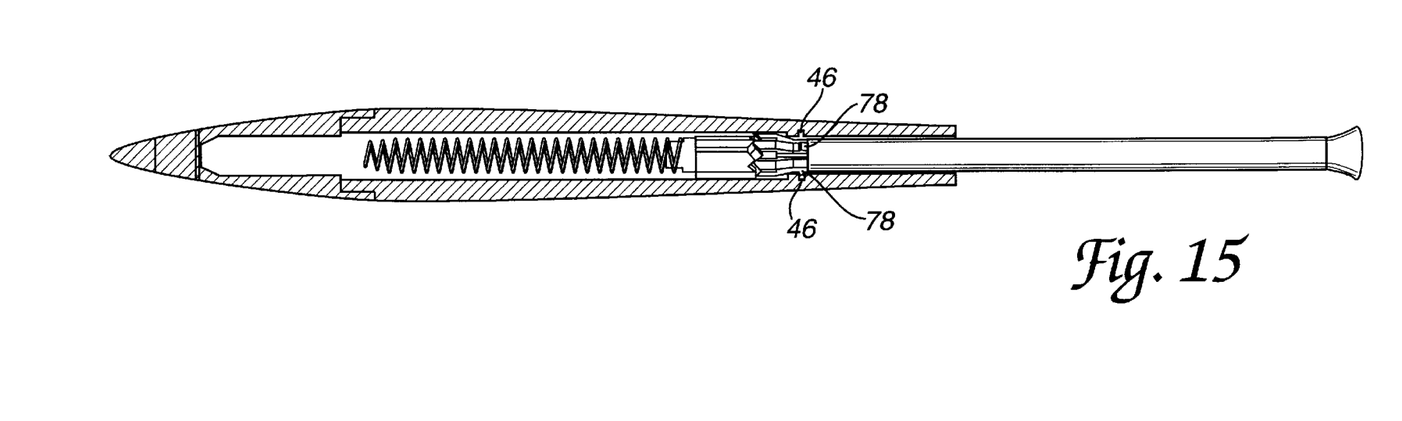
FIG. 15 is a side cross-sectional view of the stylus wherein the extension is in an open position.

FIG. 15 shows a side cross sectional view of stylus 10 wherein extension 14 has been moved to an open (extended or expanded) position, where the members of the internal detent mechanism are engaged to secure the extension in the position shown. Rotatable member 56 has rotated in the same direction as shown by arrow 82 in FIG. 14 so that guides 68 are again aligned with guides 76 in grooves of body 12 (explained with reference to FIG. 18). Tongues 78 of guide member 58 engage groove 46 of the stylus body 12 such that extension 14 remains in the open position. The two surfaces of tongue 78 are preferably at different angles, similar to surfaces 30 and 32 of member 28 in receptacle 22. These angled surfaces cause the force required to engage the internal detent mechanism to be less than the force required to disengage the internal detent mechanism, as detailed with reference to FIG. 17. Similar to the external detent mechanism described above, tongues 78 and groove 46 can be considered catch members. In an alternate embodiment, the groove can be positioned on guide member 58 and the tongues can be positioned on the interior surface of body 12.

Figure 16A:
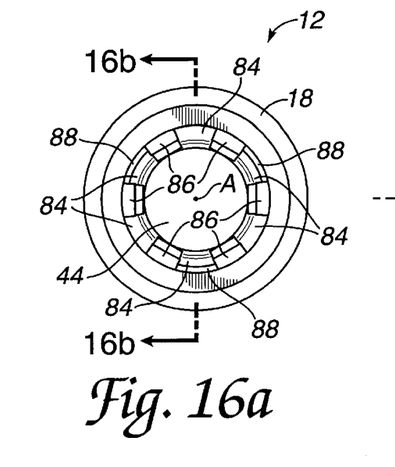
FIG. 16a shows a front view of the rear portion of the stylus body.
Figure 16B:
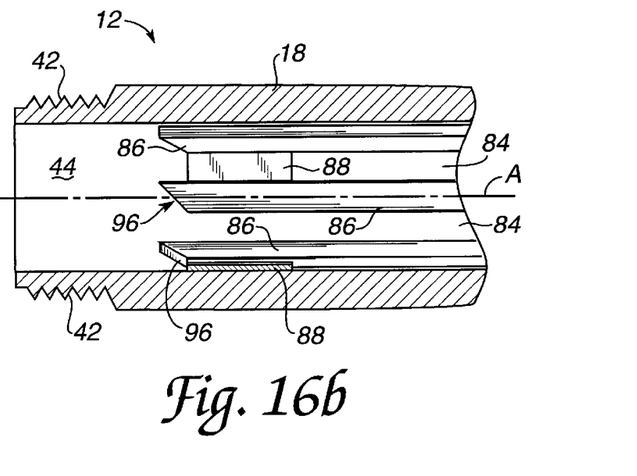

FIG. 16a shows a front view rear portion 18 of stylus body 12. FIG. 16b is a side sectional view of rear portion 18 taken along line 16b—16b of FIG. 16a. Grooves 84 are defined by a plurality of body guides 86 which extend parallel to axis A of portion 18 and end at a point in front of groove 46. Guides 86 are spaced at an equal distance from each other around the central axis A of the body 12. In the described embodiment, six guides 86 are spaced on the interior surface of portion 18. Guides 86 are preferably beveled on the ends closest to screw threads 42, exposing the beveled surface 96.

A number of stop members 88 are positioned on the interior surface of portion 18 and are located between guides 86, blocking some of grooves 84. In the described embodiment, three stop members 88 are positioned between alternating grooves 84. Stop members 88 are preferably about half the height of guides 86. Stop members 88 are operative to engage guides 68 of the rotatable member 56 to prevent extension 14 from moving in a direction away from tip 20. This is described in greater detail with reference to FIGS. 17 and 18. In other embodiments, stop members 88 can extend toward groove 46 of body 12 for substantially the entire length of guides 86. The combination of spring member 52, spring coupler 54, rotatable member 56, guide member 58, guides 86 and stop members 88 can be considered a stop mechanism, since these components secure extension 14 in the closed position and enable the extension to be changed from a extended position to a contracted position and vice-versa. Stop members 88 can also be considered catch members which engage guides (catch members) 86.

Figure 17:
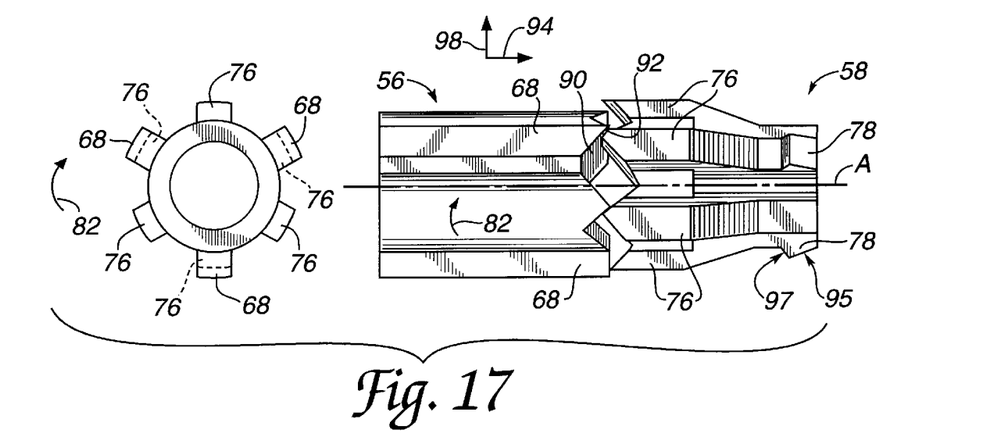
FIG. 17 shows front and side views of the rotatable member and guide member of the present invention when the extension is in an open or closed position.

FIG. 17 shows a front and side view of rotatable member 56 and guide member 58 of the present invention. Rotatable member 56 and guide member 58 are shown in an engaged position occurring when extension 14 is in a closed or open position (as shown in FIGS. 13 and 15, respectively). Each of the three guides 68 of rotatable member 56 is aligned with one of the guides 76 of guide member 58 such that they engage one of grooves 84 of body 12 as shown in FIG. 16a–b. The end surface 90 of a guide 68 is engaged with a flat edge surface 92 of a guide 76. Spring member 52 is applying force to rotatable member 56 in a direction indicated by arrow 94. Rotatable member 56 thus is inclined to rotate in a direction indicated by arrow 82, since surface 90 is positioned to slide off of surface 92. The engagement of guides 68 with grooves 84, however, keep rotatable member 56 in the position shown in FIG. 17.

When extension 14 is in a closed position, as shown in FIG. 13, guides 68 of rotatable member 56 are positioned in the three grooves 84 having stop members 88 (see FIG. 16a–b) so that the guides engage stop members 88. The guides 76 of guide member 58 do not engage stop members 88 because guides 76 are not high enough to contact the stop members. When extension 14 is in an open position, as shown in FIG. 15, rotatable member 56 has been rotated one groove position such that guides 68 engage grooves 84 which do not have stop members 88 positioned in them. Guides 68 thus do not engage any stop mechanism, and the extension is free to be moved away from tip 20 of the stylus.

FIG. 17 also shows tongues 78 positioned on alternating guides 76 at one end of guide member 58. Surfaces 95 and 97 of tongue 78 are positioned at different angles. Surface 97 is angled closer to a vertical direction (indicated by arrow 98) than surface 95. This configuration requires a greater force to disengage tongue 78 with groove 46 of body 12 than to engage the tongue with the groove. The internal (first) detent mechanism, including tongue 78 and groove 46, thus works in combination with external (second) detent mechanism such that greater force is required to overcome the internal detent mechanism than the external detent mechanism when engaging the stylus with the case. Similarly, the two detent mechanisms work in combination such that less force is required to overcome the internal detent mechanism than the external detent mechanism when disengaging the stylus from the case. In an alternate embodiment, only one of the detent mechanisms includes differently angled surfaces 95 and 97 on tongue 78 or surfaces 30 and 32 on member 28. Only one of the detent mechanisms has to include differently-angled surfaces on one of its members so that different forces will be required to engage and disengage the detent mechanisms as shown in FIGS. 3–8.

Figure 18:
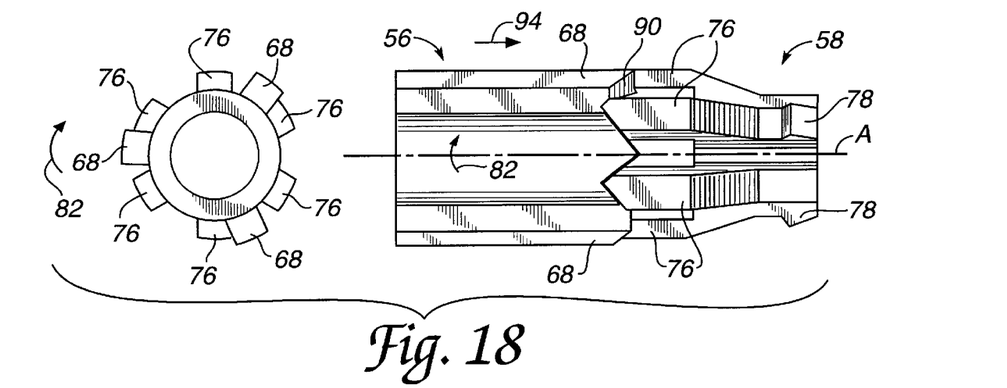
FIG. 18 shows front and side views of the rotatable member and guide member when the extension has been moved to a position as shown in FIG. 14.

FIG. 18 shows a front and side view of the rotatable member 56 and guide member 58 when extension 14 has been moved to a position as shown in FIG. 14. To obtain this position, extension 14 is moved toward the tip 20 of the stylus such that guides 68 of rotatable member 56 are no longer positioned in grooves 84, as shown in FIG. 14. Rotatable member 56 is then free to rotate in the direction indicated by arrow 82 until the notches of the sawtooth-shaped edge 70 of the rotatable member interlock with the notches of the edge 74 of guide member 58; the resulting position is shown in FIG. 18. Guides 68 are now positioned approximately between two guides 76 as shown in the front view. When force is removed from extension 14, spring member 52 forces extension 14, and thus rotatable member 56, back in a direction away from tip 20 of the stylus (i.e. in a direction shown by arrow 94). Surface 90 of guides 68 then engage the beveled edge 96 of the body guides 86 (see FIG. 16a–b). Beveled edges 96 force rotatable member 56 to rotate again in the direction indicated by arrow 82. When rotatable member 56 has been rotated to a position as shown in FIG. 17, guides 68 slide into grooves 84 of body 12 and secure the rotatable member in the position shown in FIG. 17. The stop mechanism, including rotatable member 56, guides 86 and stop members 88, has points of similarity to the mechanisms and operation thereof used in certain retractable ball point pens manufactured, for example, by Parker of the U.S.A.

In the manner thus described, rotatable member 56 is rotated one groove position each time extension 14 is pressed to a position as shown in FIG. 14. The guides 68 of the rotatable member thus alternately slide into a groove having a stop member 88 and a groove not having a stop member 88. The stylus is thus alternately changed from a closed position to an open, extended position.

While this invention has been described in terms of several preferred embodiments, it is contemplated that alterations, modifications and permutations thereof will become apparent to those skilled in the art upon a reading of the specification and study of the drawings. For example, a detent mechanism similar to the internal detent mechanism including tongue 78 and groove 46 can be used in place of the stop mechanism to retain the extension in a closed position. Also, grooves (or similar catch members) instead of tongues can be placed in the receptacle 22 and on guide member 58, respectively, and engaging members (tongues, etc.) can be placed instead of grooves on the tip of stylus 10 and in rear portion 18 of body 12. Also, the internal detent mechanism of the present invention does not have to be placed internal to the stylus body, since differently-positioned stylus detent mechanisms capable for retaining extension 14 in the extended position are suitable for the present invention. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. An extendible stylus and case therefor comprising:

an extendible stylus having a first end portion and a second end portion telescopically engaged with said first end portion, and an open position and a closed position, where said first and second portions are farther apart in said open position than when in said closed position, said stylus being provided with an internal first detent mechanism to retain said stylus in said open position and a stop mechanism to hold said stylus in said closed position, wherein said stylus is retained in said closed position when said second end portion is pressed along a longitudinal axis of said stylus from said open position, and wherein said stylus is released from said closed position when said second end portion is pressed along said longitudinal axis from said closed position to allow said second end portion to be moved to and retained in said open position; and a case engageable with said stylus such that a second detent mechanism is provided between said case and said stylus to retain said stylus in engagement with said case and to allow a user to selectively disengage said stylus from said case, said stylus being usable by said user only when said stylus is disengaged from said case, wherein said second detent mechanism is provided in a hole in said case, said hole receptive to said stylus and heaving a length approximately equal to a length of said stylus when said stylus is in said closed position, wherein said stylus is substantially surrounded by said case when engaged with said case, and wherein said second detent mechanism is operative to engage and disengage said stylus with said case when force is applied to said stylus along said longitudinal axis of said stylus, wherein a force to overcome said first detent mechanism is greater than a force to overcome said second detent mechanism when said stylus in said open position is being engaged with said case, such that said stylus is engaged with said case before said stylus is moved to said closed position when an engaging force along said longitudinal axis is applied toward said case at said second end portion of said stylus, and wherein said force to overcome said first detent mechanism is less than said force to overcome said second detent mechanism when said stylus is being disengaged from said case, such that said stylus is retained in said open position before said stylus is disengaged from said case when said force along said longitudinal axis of said stylus is applied to move said second end portion away from said first end portion, wherein said stop mechanism includes a substantially cylindrical member coupled to said second end portion, said stylus having a plurality of grooves positioned parallel to a longitudinal axis of said stylus on said first end portion, said cylindrical member having a plurality of guides and aligned parallel to a longitudinal axis of said stylus such that said guides engage said grooves when said second end portion is extended, wherein at least one stop member is positioned in at least one of said groves such that said second end portion is held in said closed position when at least one of said guides engages said at least one stop member, wherein said cylindrical member is rotated when said extension is pressed a first time such that said guides engage said grooves without engaging said at least one stop member to allow said extension to extend from said closed position, and wherein said cylindrical member is rotated when said extension is pressed a second time such that at least one of said guides engages said at least one stop member to prevent said second end portion from extending from said closed position.

2. An extendible stylus and case therefor as recited in claim 1 wherein said case is provided with a member which engages an external portion of said stylus to form said second detent mechanism.

3. An extendible stylus and case therefor as recited in claim 1 wherein said first detent mechanism includes a tongue positioned on said second end portion of said stylus and a groove positioned on said first end portion of said stylus.

4. An extendible stylus and case therefor as recited in claim 2 wherein said external portion of said second detent mechanism is positioned on said first end portion of said stylus, said external portion including a groove.

5. An extendible stylus and case therefor as recited in claim 1 wherein said tongue of said case of said second detent mechanism is substantially circular.

6. An extendible stylus comprising:

a first end portion including a tip for contacting a surface;

a second end portion telescopically engaged with said first end portion such that said stylus may be extended to an open position and collapsed to a closed position, where said first and second ends are farther apart in said open position than when in said closed position, and wherein said second end portion is moved at least partially inside said first end portion in said closed position; and an internal detent mechanism positioned between said first end portion and said second end portion to retain said stylus in said open position, said internal detent mechanism including a groove and a catch member, said catch member being operative to engage said groove to prevent said second end portion to be freely moved toward said first end portion;

a stop mechanism to hold said stylus in said closed position, said stop mechanism including a plurality of grooves positioned parallel to a longitudinal axis of said stylus on said first end portion, and a substantially cylindrical member positioned on said second end portion having a plurality of guides aligned parallel to a longitudinal axis of said stylus such that said guides engage said grooves when said second end portion is extended, wherein at least one stop member is positioned in at least one of said grooves such that said second end portion is held in said closed position when at least one of said guides engages said at least one stop member, wherein said cylindrical member is rotated when said extension is pressed a first time such that said guides engage said grooves without engaging said at least one stop member to allow said extension to extend from said contracted position, and wherein said cylindrical member is rotated when said extension is pressed a second time such that at least one of said guides engages said at least one stop member to prevent said second end portion from extending from said contracted position; and a catch member positioned on said first end portion for selectively engaging a receptacle catch member positioned in a receptacle for said stylus.

7. An extendible stylus as recited in claim 6 wherein said first portion has a first length and an exposed portion of said second end portion has a second length, wherein said second length is at least 20% of said first length.

8. An extendible stylus as recited in claim 6 wherein said first portion has a first length and an exposed portion of said second end portion has a second length, wherein said second length is at least 40% of said first length.

9. An extendible stylus as recited in claim 6 wherein said first portion has a first length and an exposed portion of said second end portion has a second length, wherein said second length is up to 80% of said first length.

10. An extendible stylus as recited in claim 6 wherein said second portion includes a spring member which is compressed when said stylus is in said closed position, said spring member forcing said second portion towards said open position.

11. An extendible stylus comprising:

a first end portion including a tip for contacting a surface;

a second end portion telescopically engaged with said first end portion such that said second end portion may be extended to provide said stylus in an open position and wherein said second end portion may be collapsed to provide said stylus in a closed position, where said first and second ends are farther apart in said open position than in said closed position, said second end portion including a spring member such that said spring member is biased when said second end portion is in said closed position and said spring member is unbiased when said second end portion is in said open position;

an internal detent mechanism positioned between said first end portion and said second end portion to retain said stylus in said open position, said internal detent mechanism including a groove and a catch member, said catch member being operative to engage said groove to prevent said second end portion to be freely moved toward said first end portion;

a stop mechanism to hold said stylus in said closed position, said stop mechanism including a plurality of grooves positioned parallel to a longitudinal axis of said stylus on said first end portion, and a plurality of guides positioned on said second portion such that said guides engage said grooves when said second end portion is extended, wherein at least one stop member is positioned in at least one of said grooves such that said second end portion is held in said closed position when at least one of said guides engages said at least one stop member; and a catch member positioned on said first end portion for selectively engaging a receptacle catch member positioned in a receptacle for said stylus.

* * * * *

UNITED STATES PATENT AND TRADEMARK OFFICE
CERTIFICATE OF CORRECTION

PATENT NO. :5,889,512
DATED :March 30, 1999
INVENTOR(S) :Moller et al.

It is certified that error appears in the above-identified patent and that said Letters Patent are hereby corrected as shown below:

Column 5, line 24, "thy" should be --the--.

Column 10, line 46, "heaving" should be --having--.

Column 11, line 12, "groves" should be --grooves--.

Column 11, lines 34 and 35, "second detent mechanism" should be --stylus--.

Column 12, line 56, after "guides" insert --aligned parallel to a longitudinal axis of said stylus and--.

UNITED STATES PATENT AND TRADEMARK OFFICE
CERTIFICATE OF CORRECTION

PATENT NO. : 5,889,512
DATED : March 30, 1999
INVENTOR(S) : moller, et. al.

It is certified that error appears in the above-identified patent and that said Letters Patent is hereby corrected as shown below:

Column 12, line 62, after "one stop member" insert: --, wherein said stop mechanism includes a cylindrical member positioned on said second end portion having said plurality of guides, wherein said cylindrical member is rotated when said second end portion is pressed a first time such that said guides engage said grooves without engaging said at least one stop member to allow said second end portion to extend from said contracted position, and wherein said cylindrical member is rotated when said second end portion is pressed a second time such that at least one of said guides engages said at least one stop member to prevent said second end portion from extending from said contracted position--.

Signed and Sealed this

Eleventh Day of January, 2000

Attest:

Q. TODD DICKINSON

*Attesting Officer*      *Acting Commissioner of Patents and Trademarks*